May 20, 1924.
O. B. DEPUE
1,494,593
MOTION PICTURE FILM MARKING DEVICE
Filed Feb. 6, 1922    2 Sheets-Sheet 1
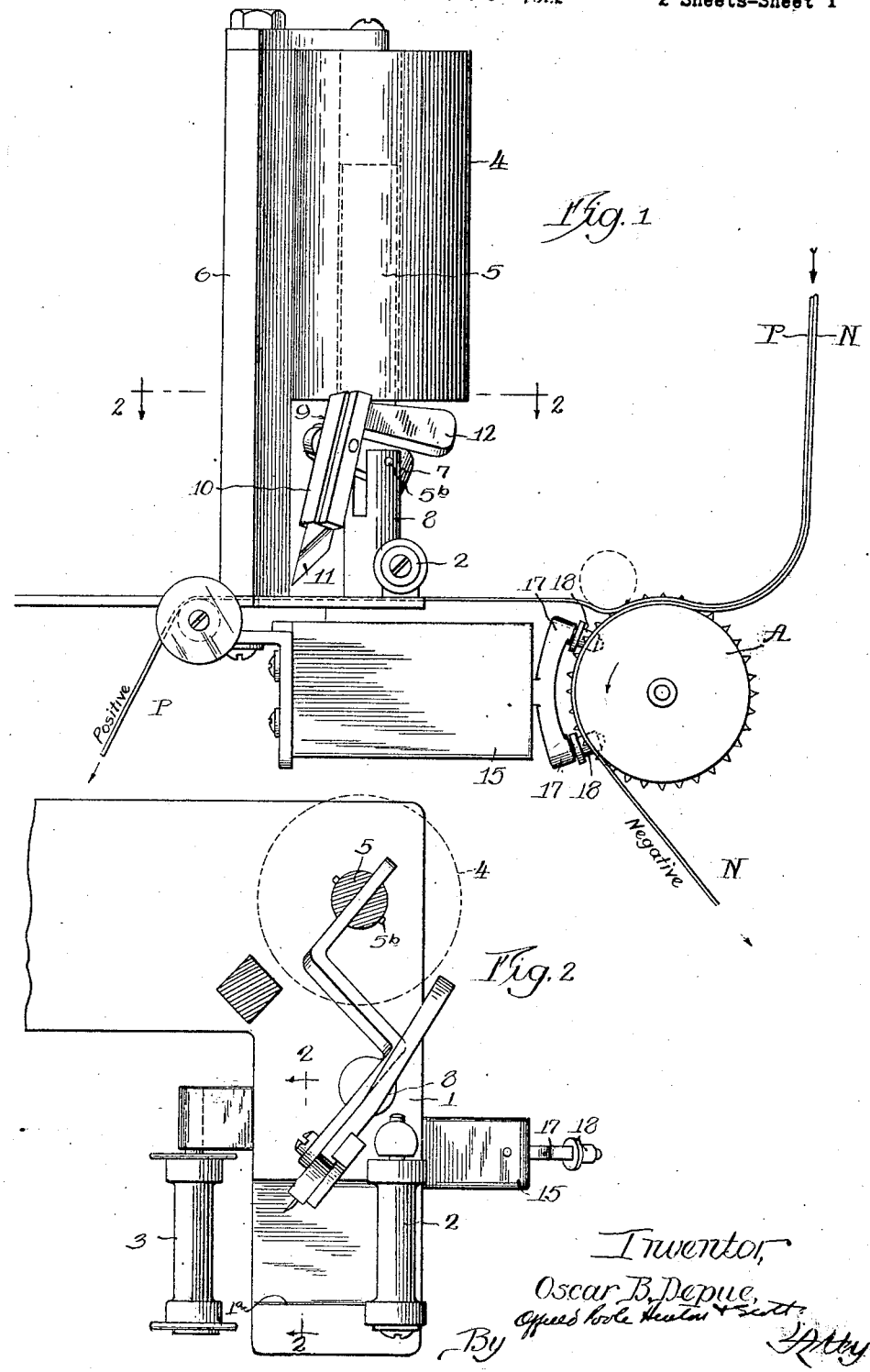

May 20, 1924.
O. B. DEPUE
MOTION PICTURE FILM MARKING DEVICE
Filed Feb. 6, 1922
1,494,593
2 Sheets-Sheet 2
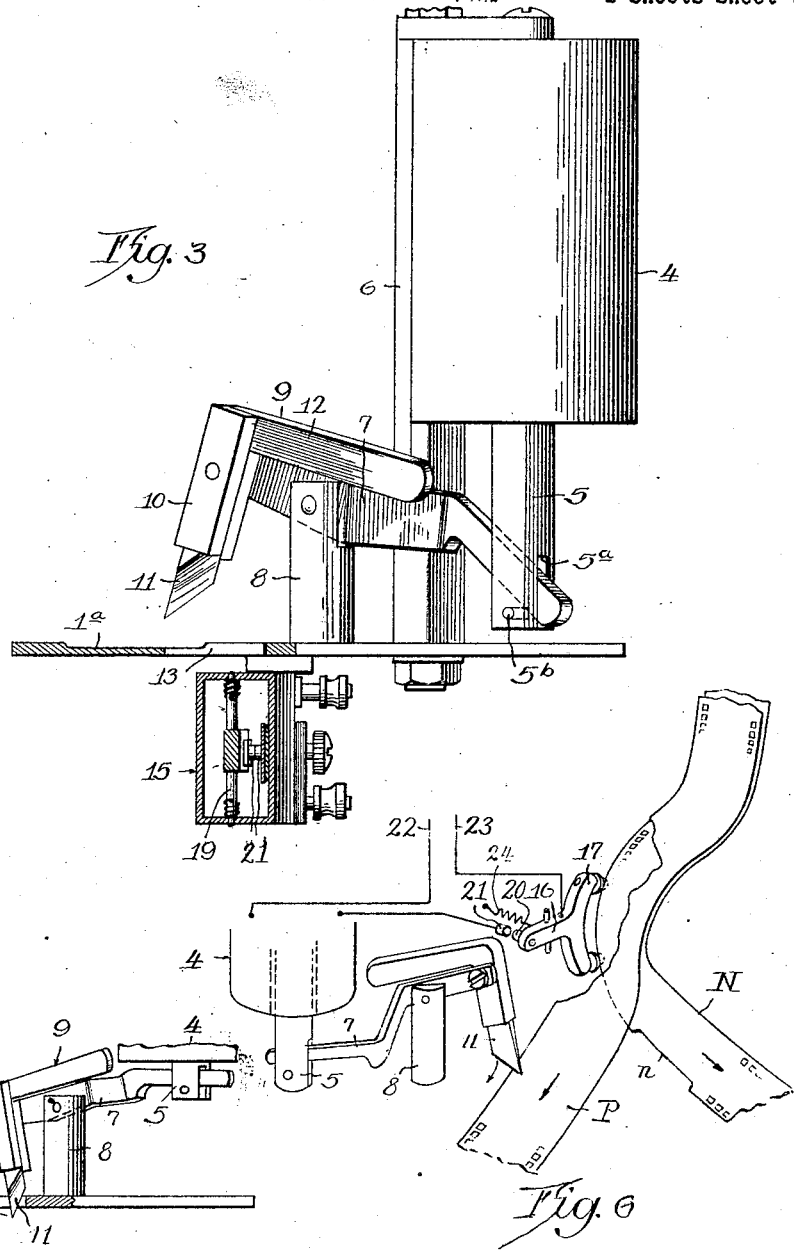
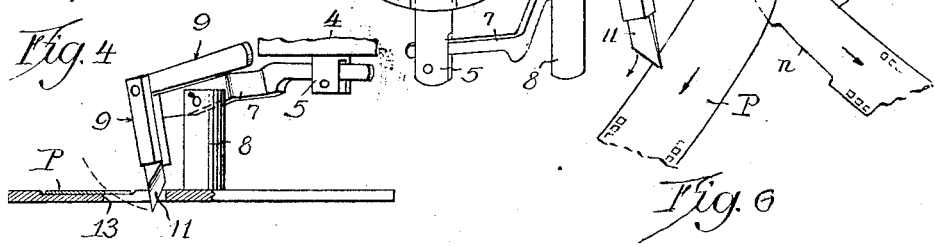
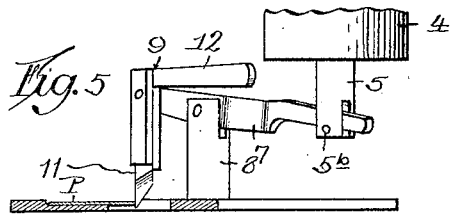
Inventor,
Oscar B. Depue Patented May 20, 1924.

1,494,593

UNITED STATES PATENT OFFICE.

OSCAR B. DEPUE, OF CHICAGO, ILLINOIS.

MOTION-PICTURE-FILM-MARKING DEVICE.

Application filed February 6, 1922. Serial No. 534,323.

*To all whom it may concern:*

Be it known that I, OSCAR B. DEPUE, a citizen of the United States, and a resident of Chicago, in the county of Cook and State of Illinois, have invented certain new and useful Improvements in Motion-Picture-Film-Marking Devices, of which the following is a specification.

This invention relates to improvements in motion picture marking devices, and more particularly to a device to be used in conjunction with a film printing machine for automatically marking the positive film to indicate the points at which the film is to be severed for the purpose of more conveniently developing the same.

A device for the same purpose and operating in somewhat the same manner was disclosed in a prior patent for motion picture film printing apparatus granted to me November 20, 1923, and bearing Patent No. 1,474,409. The device herein disclosed may be considered an improvement over the previous device.

The process of printing motion picture films is accomplished by means of a printing machine which operates in a general way to advance the negative film with a sensitized positive film superimposed thereon, in front of an aperture through which light rays from a suitable source of light emanate. The negative film may be of any desired length, as, for instance, one thousand feet, such a film being ordinarily termed a reel.

Furthermore, in the printing machine, the films are fed from one set of reels and rewound on another set subsequent to the printing operation. In the case of the negative film, the length that can be handled is only limited by the size of the reels, but in the case of the positive film, it is necessary to divide the same into shorter lengths of, say, two hundred feet, for the purpose of developing. At the present time, it has been found unsatisfactory to develop lengths of films of any considerably greater length, and, therefore, in order to expedite the complete treatment of the positive film, I have provided a device which will automatically mark the film every two hundred or so feet, so that it may be easily severed or cut at the points marked without measuring the film as it is wound from the reel. The object, therefore, of the invention, is to provide a simple and dependable device which operates automatically to mark the film, such a device being preferably constructed so that it may be readily mounted on various makes of printing machines.

The drawings illustrate a preferred construction of the device, and is shown in its relation with respect to those parts of the printing machine with which it cooperates, it being understood that with certain variations in design, it is adaptable to any and all printing machines.

In the accompanying drawings,

Figure 1 is a view in side elevation of the marking device, showing its relation to the film to be marked thereby.

Figure 2 is a top plan view of the marking elements as taken on line 2—2 of Figure 1, Figure 3 is a view in rear elevation with part shown in section, as taken on line 3—3 of Figure 2, Figure 4 is a fragmentary view of a portion of Figure 3, showing the cutting element in the act of marking the film, Figure 5 is a similar view showing the cutting element in the position immediately after the film has been cut and about to be restored to its normal position, as shown in Figure 3, and Figure 6 is a diagrammatic view showing the complete marking device and the diagram of the electrical connections.

As suggested in the introductory remarks, the negative film "N" and the positive film "P" (Figure 1) may be assumed to be traveling in a vertically downward direction in interposed relation, having passed the printing aperture of the machine, and about to engage a rotative tooth sprocket "A", which is positively driven by the motive power of the printing machine. The negative film "N" is beneath the positive film as it engages the sprocket "A", and passes around the same, and is taken off from its under side in an oblique downwardly direction to a reel on which the same is rewound. The positive film "P" is taken from the sprocket "A" on the top side thereof, and is directed in a horizontal direction to a plate 1 provided with a shallow groove 1ª, along which the positive film travels, upon leaving the pulley. At the inner end of the groove 1ª is mounted a guide pulley 2 located above the path of the film, and immediately beyond the far end of the groove is another guide pulley 3 over which the film passes in a generally downward direction to another reel on which the same is rewound.

As clearly shown in Figure 2, the plate 1 is generally L-shaped and forms the base plate or foundation of the film marking device about to be described. The plate 1 is supported in any suitable manner upon the printing machine, so that the groove 1ª is in alignment with the path of the positive film as it leaves the sprocket "A."

Mounted upon the plate is a solenoid 4 of any suitable construction and design, the same being a well known electrical device capable of imparting movement to a core or armature 5 mounted within an axial passage extending through the coil of the solenoid. The solenoid is preferably supported by means of an upright post 6 secured to the plate 1. The core or armature 5 extends downwardly beyond the coil of the solenoid 4 and has operative connection at its lower end with the cutting element preferably constructed in the following manner: A lever 7 is pivotally supported or fulcrumed intermediate its ends upon a short upright post 8 located intermediate the solenoid 4 and the slot 1ª or path of the film. One end of the lever 7 has operative connection with the core or armature 5 of the solenoid, preferably engaging a slot 5ª formed in the lower end of the core, and secured therein by means of a transverse pin 5ᵇ. At the free end of the lever which terminates almost immediately above the adjacent edge of the path of the film, is pivotally mounted a cutting element 9. The cutting element consists of an L-shaped member or two arms meeting at right angles and pivotally connected to the lever 7 adjacent their point of intersection. The section 10 of the cutting element depends in a general vertical direction, and carries at its lower end a cutting blade 11, which is wedge-shaped and sharpened along its inner oblique edge; that is, the edge facing toward the solenoid 4. The other part or arm 12 of the cutting element extends in a general horizontal direction, and substantially in alignment with the lever 7. This arm serves as a weight acting to swing the cutting element in a counterclockwise direction immediately after each cutting operation, as will hereinafter be more fully described.

Without describing at this point the means for energizing the solenoid and for controlling the action thereof, it may be assumed that if current is passed through the solenoid, the magnetism produced thereby will act on the core or armature 5, tending to draw it upwardly into the coil a distance that is accurately represented by comparing Figures 3 and 4. It may be further assumed that under non-operative conditions, the parts occupy the positions shown in Figure 3, with the cutting element, and particularly the blade 11 thereof, suspended above the right hand edge of the groove 1ª. Formed within the plate 1ª is a slot 13 extending obliquely to the groove 1ª, and in alignment with the path of the blade, it being observed from Figure 2 that the lever 7 is likewise positioned obliquely to said groove 1ª, as well as the path of the film.

Referring now to Figures 4 and 5, it will be seen that if the solenoid is energized, and the core displaced vertically in an upward direction, the lever 7 is swung in the vertical plane, carrying the cutting element downwardly into the position shown in Figure 4, with the plate 11 entering the slot 13 with an oblique movement from the left to right. The positive film "P" may be also assumed to be moving from right to left as shown in Figure 1, so that in the downward movement of the cutting element a slit is cut in the margin of the film as the blade 11 passes through and below the film. The film being advanced continuously, manifestly moves onwardly beyond the blade, with the result that the back edge of the blade engages the adjacent edge of the film, as clearly shown in Figure 5. In the meantime, it may be assumed that the solenoid has been demagnetized so that the core again drops downwardly into its normal position, and at the same time throwing up the cutting element to its nonoperative position, as shown in Figure 3. The pivoting of the cutting element, as hereinbefore described, permits the same to be disengaged from the film after the cut has been made, and avoids again cutting the film during the upward movement of the blade, which would manifestly be the result if the cutting blade were rigidly connected to the lever 7. In other words, it permits the cutting element to return to its normal position without injuring the film. The arm 12 of the cutting element acts as a counterweight during the upward movement of the cutting element, thereby restoring the blade holding arm 10 to its normal position after the disengagement of the blade and the film, and otherwise maintains the cutting element stable.

Referring now to the mechanism or means for actuating the marking device through the medium of the solenoid, the same comprises in general a switch located in an electric circuit which includes the coil of the solenoid. The switch is in turn operated to close the circuit by coacting with the negative film in such a way that at predetermined points in said film are formed notches or cut-out portions in its edge, which are engaged by a part of the switch mechanism, and permits the circuit to be closed; thus operating the cutting device.

The switch mechanism is located beneath the plate 1, and within a housing 15 arranged immediately below and parallel with the portion of the positive film extending from the guide sprocket "A" through the marking device. As clearly shown in Figures 1, 3 and 6, the main element of the switch mechanism consists of a lever 16 which projects from the end of the housing 15 adjacent the guide sprocket "A" in the form of upwardly and downwardly extending arms 17—17, carrying at their ends the rollers 18—18 projecting forwardly from the arms 17—17 with their axes slightly converging. These rollers, as clearly shown in Figure 6, are positioned so as to engage the edge of the negative film as it passes downwardly in contact with the surface of the guide sprocket "A." The switch lever 16 is further positioned so that as long as the rollers engage the straight edge of the film, the switch is maintained in open position as well as the circuit which it controls. The switch lever 16 is pivotally mounted within the housing 15 and upon a vertically arranged spindle 19 located intermediate the ends of the lever, and journalled within the housing. At the inner or opposite end of the lever is carried a contact point 20 adapted to coact with a complementary contact point 21. This circuit is clearly shown in Figure 6 and consists of two conductors 22 and 23, which include the switch lever 16 and solenoid 4 in series therewith, this circuit being opened and closed by the movement of the switch lever 16 about the axis of the spindle, and the resulting make and break at the contact points 20 and 21. Normally, the circuit is open and the switch lever retained in open position with the rollers merely riding on the edge of the film. A suitable coil spring 24 acts on the switch lever to press the end thereof carrying the contact point 20, in a direction to close the circuit.

The method of treating the negative film so as to operate the switch will be understood from the following: In preparing the negative film for the purpose of producing positive films therefrom, a notch or recess "n" is formed in the edge of the negative film "N," as is clearly shown in Figure 6. These notches are spaced apart throughout the length of the negative film, depending on the lengths into which the positive film is to be divided after the printing process, and for the purpose of convenience in the developing process. Thus, as the positive negative films pass through the printing apparatus, and the positive film separated from the negative and passed through the cutting device, the switch member 16 is positioned just beyond the point of separation; to-wit; at the edge of and in alignment with the circumference of the guide sprocket "A," as shown in Figure 1. Now, as each notch in the negative film is engaged by the rollers 18—18, the latter drop into the notch, thus permitting the lever to be rotated about its vertical axis and under the action of the spring 24, thus momentarily closing the circuit, causing the solenoid to be energized, and actuating the film cutting members in the manner hereinbefore described. Thus it will be seen that as the films are fed through the machine, and immediately before they are rewound on their respective reels, a cut or slit will be formed in the edge of the positive film corresponding to each notch "n" in the negative film. It follows, therefore, that the positive film can then be unwound from its reel, and the operator, by allowing the reel to run through his fingers, can readily ascertain at what points the film is to be cut, in order that it may be divided into suitable lengths for developing.

It is manifest that other methods of marking may be resorted to, such as the punching device shown in my previous application, and furthermore, the structure may be modified or changed in order that the device may be installed on different makes of printing machines. However, the principle of automatically marking the positive film by an electrical or other apparatus, controlled by the presence of indicating notches in the negative film, is present in all forms. Therefore, it is not intended that the invention shall be limited to any specific construction, except in so far as it is set forth in the appended claims.

I claim as my invention:

1. The combination with means for advancing the superimposed films of a marking device located in the path of the film to be marked, the other film to be provided with marginal recesses at predetermined intervals throughout its length, and means for actuating said marking device including a member engaged by the recessed edge of said last mentioned film and operating intermittently by the contact with said recesses to actuate said marking device.

2. In a film marking device, the combination with a positive and negative film, of means for advancing said films, a cutting implement mounted in the path of one of said films, a circuit including a solenoid operatively connected with said implement and a switch adapted to be normally held in circuit opening position in contact with other of said films, said last mentioned film being provided with means for operating said switch at predetermined intervals to close said circuit and to actuate said cutting implement.

3. The combination with means for advancing a positive and negative film of a marking device mounted in the path of one of said films and operative to sever the edge thereof, a circuit including a solenoid operatively connected with said marking device and a switch having an operating member in contact with the edge of the other film, said last mentioned film being provided with means for shifting said switch operating member to close said circuit at predetermined intervals.

4. A marking device adapted to be mounted in the path of a positive film, and adjacent the path of a negative film, and comprising a marking implement mounted adjacent the edge of said positive film, and operative to sever the edge thereof, a solenoid operatively connected with said implement, a solenoid circuit including a switch normally retained in open position in contact with the edge of said negative film, and means on said edge of said negative film for closing said switch at predetermined intervals in the movement of said negative film.

5. In a marking device, the combination with a positive and a negative moving picture film, and means for advancing said films in superimposed relation, and thence directing them along separate paths, of a film marking implement, means for guiding the positive film beneath said implement, a solenoid operatively connected with said implement, a solenoid circuit and a switch in said circuit comprising a lever engaging the edge of said negative film, and normally held in open position, said film having notches at predetermined intervals, permitting the movement of said lever into circuit closing position, whereby the implement is actuated to mark the positive film.

6. In a marking device, the combination with a positive and a negative moving picture film, and means for advancing said films in superimposed relation, and thence directing them along separate paths, of a film cutting implement mounted adjacent the path of said positive film, a solenoid operatively connected with said implement, and a switch in circuit with said solenoid and comprising a lever engaging an edge of said negative film, and normally held in open position thereby, said negative film having notches at predetermined intervals along said edge thereof, whereby the lever is actuated to momentarily close the circuit to operate said cutting implement.

7. The combination with a positive and negative moving picture film, and means for advancing the same in superimposed relation, and thence directing the same to separate reels, of a device for marking the positive film located adjacent the point of separation of said films, and comprising a guide plate, a lever mounted on said plate, a cutting blade carried by said lever, a solenoid operatively connected with said lever, a solenoid circuit and a switch comprising a lever mounted for engagement with the edge of said negative film, through the medium of a roller, said lever normally positioned to open said circuit, and cooperating with notches formed in said negative film for momentarily closing said switch at predetermined intervals in its length.

8. The combination with a positive and negative moving picture film, and means for advancing the same in superimposed relation, and thence directing to separate reels, of a device for marking the positive film located adjacent the point of separation of said films, and comprising a lever fulcrumed intermediate its ends, a solenoid having operative connection with one end of said lever, a cutting member pivotally mounted at the other end, and normally positioned above the path of the edge of said positive film, and a switch in circuit with said solenoid and operative to momentarily close said circuit by engagement with notches in the edge of said negative film.

9. In a film marking device, the combination with a positive and a negative moving picture film, and means for advancing said films, of a film cutting implement mounted adjacent the path of said positive film, comprising a lever, a blade pivotally mounted upon said lever, having an arm extending at right angles thereto, and acting to maintain said blade in cutting position, a solenoid connected with said lever, a solenoid circuit, and a switch operative by contact with the edge of said negative film, the latter being treated to actuate said switch to momentarily close the circuit to operate said cutting implement.

10. The combination with a positive and negative moving picture film and means for advancing same in superimposed relation, and thence directing said positive film to separate reels along a guide plate, of a device for cutting the positive film comprising a guide, a lever mounted on said plate, a cutting blade pivotally mounted on said lever, and positioned above a slot formed in said plate and beneath the edge of said positive film, said cutting blade including an arm acting to maintain said blade in cutting position, and mechanism for operating said lever, the same being controlled by said negative film to cut the positive film at predetermined intervals throughout its length.

11. The combination with a positive and negative moving picture film and means for advancing the same in superimposed relation, of a device for marking the positive film, comprising a lever fulcrumed intermediate its ends, a solenoid having operative connection with one end of said lever, a cutting member pivotally mounted at the other end, and positioned above the path of one edge of said positive film, said cutting member being directed downwardly and free to swing a weighted arm associated with said blade for stabilizing the same, and a switch in circuit with said solenoid and having a contact member engaging the edge of said negative film, the same being provided with notches acting to permit the momentary closing of said circuit at predetermined intervals.

12. The combination with a moving picture film printing machine, of a positive film marking device, comprising a film cutting implement mounted in the path of the positive film, mechanism for actuating said cutting implement, and means engaging the negative film for automatically controlling the action of said mechanism through the medium of notches formed in the edge of said negative film.

13. The combination with a machine for printing a positive from a negative moving picture film, of a film marking implement mounted in the path of the positive film, a solenoid operatively connected with said implement, a solenoid circuit and a switch in said circuit comprising a lever engaging the edge of the negative film through the medium of rollers, and normally said negative film having notches at predetermined intervals, permitting the movement of said lever into circuit closing position, whereby the implement is actuated to mark the positive film.

In witness whereof, I hereunto subscribe my name this 1st day of February, A. D., 1922.

OSCAR B. DEPUE.